United States Patent
Nussbaum et al.

(10) Patent No.: US 11,107,162 B1
(45) Date of Patent: Aug. 31, 2021

(54) SYSTEMS AND METHODS FOR PREDICTIVE MODELING VIA SIMULATION

(71) Applicant: STATE FARM MUTUAL AUTOMOBILE INSURANCE COMPANY, Bloomington, IL (US)

(72) Inventors: Bryan R. Nussbaum, Bloomington, IL (US); Jeremy Carnahan, Normal, IL (US); John A. Schirano, Bloomington, IL (US); Vicki King, Bloomington, IL (US); Mike McGraw, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 20 days.

(21) Appl. No.: 16/244,923

(22) Filed: Jan. 10, 2019

(51) Int. Cl.
*G06Q 40/08* (2012.01)
*G06F 17/18* (2006.01)
*G06T 17/05* (2011.01)
*G06F 30/20* (2020.01)

(52) U.S. Cl.
CPC ............ *G06Q 40/08* (2013.01); *G06F 17/18* (2013.01); *G06F 30/20* (2020.01); *G06T 17/05* (2013.01)

(58) Field of Classification Search
CPC .................................................. G06Q 40/08
See application file for complete search history.

(56) References Cited

U.S. PATENT DOCUMENTS

| | | | | |
|---|---|---|---|---|
| 8,280,633 B1* | 10/2012 | Eldering | ............... | G06Q 40/08 702/3 |
| 9,129,355 B1* | 9/2015 | Harvey | ............... | G06K 9/52 |
| 9,152,863 B1* | 10/2015 | Grant | ............... | G06Q 10/20 |
| 9,978,030 B2 | 5/2018 | Lim | | |
| 10,037,464 B2 | 7/2018 | Schultz et al. | | |
| 10,204,193 B2* | 2/2019 | Koger | ............... | G06F 30/13 |
| 10,289,760 B1* | 5/2019 | Oakes, III | ............... | G06F 30/13 |

(Continued)

FOREIGN PATENT DOCUMENTS

| KR | 101762809 B1 | 7/2017 | | |
|---|---|---|---|---|
| WO | WO-2015105886 A1 * | 7/2015 | ............. | G08G 5/045 |

OTHER PUBLICATIONS

"Wood et al., Image Acquisition and Processing for Insurance Risk Assessments, Oct. 30, 2017, Ip.com, entire document" (Year: 2017).*

(Continued)

*Primary Examiner* — Hani M Kazimi
*Assistant Examiner* — Adam Hilmantel
(74) *Attorney, Agent, or Firm* — Lee & Hayes, P.C.

(57) ABSTRACT

Methods, systems, and computer readable media for predictively determining a risk of damage to a property are provided. To determine the risk, a high resolution virtual model of a region that includes the property is obtained. The virtual model is imported into a simulation environment. One or more of the simulation parameters are set based on historic weather data for the region. For example, each parameter may be associated with a probability distribution derived based on the historic weather data that is sampled prior to executing the simulation. One or more simulations are executed in accordance with the sampled inputs to simulate the likely weather patterns the property will experience. The result of the simulation is analyzed to determine the predicted risk of damage to the property.

20 Claims, 7 Drawing Sheets

(56) References Cited

U.S. PATENT DOCUMENTS

| | | | |
|---|---|---|---|
| 2009/0265193 A1* | 10/2009 | Collins | G06Q 30/0185 |
| | | | 705/4 |
| 2010/0106674 A1* | 4/2010 | McLean | F24F 11/30 |
| | | | 706/52 |
| 2012/0072039 A1* | 3/2012 | Anderson | G06Q 10/06315 |
| | | | 700/291 |
| 2014/0019166 A1* | 1/2014 | Swanson | G06Q 50/16 |
| | | | 705/4 |
| 2014/0023280 A1* | 1/2014 | Lin | G06K 9/00 |
| | | | 382/218 |
| 2016/0063642 A1 | 3/2016 | Luciani et al. | |
| 2017/0169534 A1 | 6/2017 | Wani et al. | |
| 2017/0270616 A1* | 9/2017 | Basso | G06Q 10/06314 |
| 2019/0102689 A1* | 4/2019 | Lassoued | G07C 5/0841 |
| 2019/0286970 A1* | 9/2019 | Karaletsos | G06N 3/0454 |

OTHER PUBLICATIONS

"Insurers Big and Small Adopting Drone Tech Rapidly Across Insurance Life Cycle", retrieved at least as early as Aug. 31, 2018, at <<https://novarica.com/insurers-big-and-small-adopting-drone-tech-rapidly-across-insurance-life-cycle/>>, Novarica, Aug. 2018, 4 pages.

Shahbazi, et al., "Development and evaluation of a UAV-photogrammetry system for precise 3D environmental modeling", Sensors, vol. 15, No. 11, Oct. 2015, pp. 27493-27524.

Varghese, et al., "Power infrastructure monitoring and damage detection using drone captured images", International Joint Conference on Neural Networks (IJCNN), IEEE, 2017, pp. 1681-1687.

\* cited by examiner

SYSTEMS AND METHODS FOR PREDICTIVE MODELING VIA SIMULATION

FIELD OF THE DISCLOSURE

The present disclosure relates to modeling risk of damage to properties, and, in particular, to modeling the risk of damage based upon simulation acting upon a virtual model of the property.

BACKGROUND

Traditionally, underwriters analyze historical data to understand their risks. For example, an underwriter may analyze an average annual rainfall to estimate a likelihood that the property floods. However, such techniques can only generally determine a risk associated with a region, not a risk that is particular to a specific property.

In some prior attempts to solve this problem, underwriters have looked to aerial imagery to better understand the characteristics of different properties. While the aerial imagery techniques traditionally relied upon are able to generally provide an indication of a type of property (e.g., residential, commercial, etc.) and/or the presence of vegetation, the aerial images do not provide sufficient resolution to determine unique characteristics associated with different properties. Accordingly, traditional techniques of assess risk based on general assumptions about the property, rather than the particular characteristics of an individual property. For example, while neighboring residential properties may have different risks due to different types of vegetation having a varying capacity to absorb water and/or different topographical positioning with respect to a runoff system, the traditional techniques would identically assess these neighboring residential properties based on the historic data. As a result, these traditional solutions that rely upon aerial imagery do not accurately reflect the true risk of damage associated with a property.

SUMMARY

In one aspect, a computer-implemented method is provided. The method may include (1) identifying, by one or more processors, a virtual model of a region, the virtual model being generated based upon a plurality of images captured by a remote imaging vehicle, wherein the virtual model models the region to an accuracy of at least 10 cm and includes component virtual models of a plurality of properties in the region; (2) importing, by one or more processors, the virtual model of the region into a simulation environment; (3) based on a plurality of historical weather data associated with the region, setting, by the one or more processors, one or more parameters of the simulation environment, wherein the one or more parameters model a weather system; (4) in accordance with the one or more parameters, executing, by the one or more processors, a simulation where the weather system acts upon the virtual model of the region; (5) analyzing, by the one or more processors, a result of the simulation to determine a risk of damage to a component virtual model of a property in the region during the simulation; and (6) updating, by the one or more processors, a record corresponding to the property to indicate the risk of damage to the virtual model of the property during the simulation.

In another aspect, a system is provided. The system may include (i) one or more processors; (ii) one or more transceivers operatively connected to the one or more processors and configured to send and receive communications over one or more communication networks; and (iii) one or more non-transitory memories coupled to the one or more processors and storing computer-executable instructions, that, when executed by the one or more processors, cause the system to (1) identify a virtual model of a region, the virtual model being generated based upon a plurality of images captured by a remote imaging vehicle, wherein the virtual model models the region to an accuracy of at least 10 cm and includes component virtual models of a plurality of properties in the region; (2) import the virtual model of the region into a simulation environment; (3) based on a plurality of historical weather data associated with the region, set one or more parameters of the simulation environment, wherein the one or more parameters model a weather system; (4) in accordance with the one or more parameters, execute a simulation where the weather system acts upon the virtual model of the region; (5) analyze a result of the simulation to determine a risk of damage to a component virtual model of a property in the region during the simulation; and (6) update a record corresponding to the property to indicate the risk of damage to the virtual model of the property during the simulation.

In yet another aspect, a non-transitory computer-readable medium storing computer-executable instructions is provided. The instructions, when executed by one or more processors, cause one or more processors to (1) identify a virtual model of a region, the virtual model being generated based upon a plurality of images captured by a remote imaging vehicle, wherein the virtual model models the region to an accuracy of at least 10 cm and includes component virtual models of a plurality of properties in the region; (2) import the virtual model of the region into a simulation environment; (3) based on a plurality of historical weather data associated with the region, set one or more parameters of the simulation environment, wherein the one or more parameters model a weather system; (4) in accordance with the one or more parameters, execute a simulation where the weather system acts upon the virtual model of the region; (5) analyze a result of the simulation to determine a risk of damage to a component virtual model of a property in the region during the simulation; and (6) update a record corresponding to the property to indicate the risk of damage to the virtual model of the property during the simulation.

DETAILED DESCRIPTION

Methods, systems, and computer readable media for predictively modeling risks associated with a property are described herein. More particularly, the present disclosure relates to predictively simulating weather conditions acting upon a "digital twin" of the property to determine a risk of damage to the property due to weather events. As it is generally used herein, a digital twin refers to a high resolution virtual model of a physical property. As it is generally used herein, "high resolution" refers to the virtual model modeling the physical property to an accuracy on the scale of at least 10 cm. That is, the underlying image data that forms the basis of the virtual model can represent portions of the region that are 10 cm or less apart from one another. In some embodiments, the high resolution model accurately models the region on the scale of 1 cm, 100 mm, or less. Accordingly, when the virtual model is imported into a simulation environment, the simulation acts upon an accurate representation of the region.

In some embodiments, the virtual model is more than just a visually accurate representation of the property, but also one that accurately models the structural properties of the property. As one example, the system may identify and simulate the performance of a ground material covering a surface of the region (e.g., asphalt, gravel, grass and/or particular species thereof, sand, mud, and so on). In this example, the simulation application models the ability of the different materials to absorb water. As another example, structural properties may be associated with a building information modeling (BIM) representation that identifies the component materials used to construct the structure. For example, the BIM of a property may indicate the particular type of material used to support the structure (e.g., the material of the internal structural components such as columns, struts, frames, etc.) and/or external surface material (e.g., a siding material, a roofing material, a window material, etc.). Based on the particular materials, the simulation application may model the structure's resistivity to weather events and/or any long-term erosive effects caused thereby. In some embodiments, the high resolution image data enables the external materials to be identified and/or classified via image analysis techniques.

In addition to accurately modeling the behavior of the properties within the region when acted upon by a weather event, the techniques describe herein also predictively model the weather events expected to act upon the property. To this end, traditional modeling approaches rely on data, such as an average rainfall, that assumes all properties within particular regions experience the same amount of precipitation during a storm. However, this data does not describe the true distribution of water during a storm, in particular, with respect to water flows. Instead, techniques disclosed herein, simulate weather events to model how storms actually impact an environment. For example, the simulation may model wind patterns, storm intensities, storm densities, precipitation type, and/or other weather characteristics to accurately simulate how the storm impacts each specific part of the region differently.

In some embodiments, each of these weather characteristics are associated with probability distribution that models an intensity and/or likelihood of occurrence associated with each weather characteristic. For example, maximum wind speed may be modeled on a scale of 0-160 miles per hour; whereas, a probability of a tornado occurring may be modeled on a scale of probabilities from 0-1. Techniques described herein may develop the various probability distributions based on historical data and may continuously update the probability distributions as new data is obtained. Accordingly, to accurately assess the weather risk over time, techniques described herein execute a plurality of simulations (e.g., 100 simulations, 1000 simulations, 5000 simulations, 10000 simulations, and so on) each sampling the various probability distributions to simulate the most likely weather events to occur in the region.

Consequently, the techniques described herein predictively model both the expected types of weather experienced by the region and the ability of the property to withstand the expected weather to accurately model a risk of damage to the property. As a result, the risk of damage to a specific property can be accurately predicted and distinguished from the risk of damage to other, similarly-situated properties.

Figure 1:
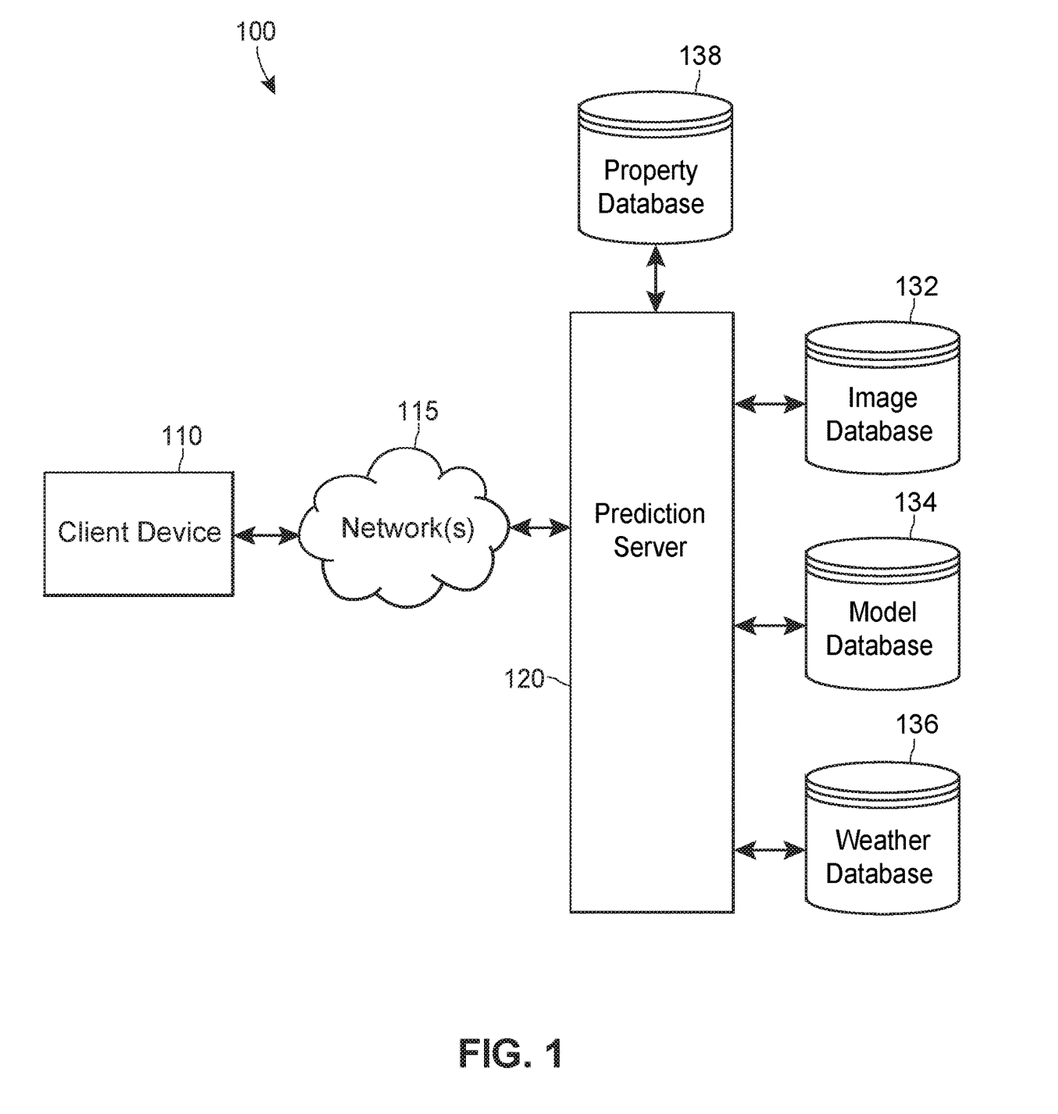
FIG. 1 depicts an example environment for predictively modeling risks associated with a property.

Turning to FIG. 1, illustrated is an example environment 100 for predictively modeling risks associated with a property. Although FIG. 1 depicts certain entities, components, and devices, it should be appreciated that additional or alternate entities and components are envisioned.

As illustrated, the environment 100 may include a client device 110. The client device 110 may be any type of electronic device, such as a desktop computer, a laptop, a tablet, a smartphone, a phablet, a smart watch, smart glasses, wearable electronics, pager, personal digital assistant, and/or any other electronic device, including computing devices configured for wireless radio frequency (RF) communication. The client device 110 may store and execute an application that enables the client device to interface with a prediction server 120 to perform the predictive modeling techniques described herein. More particularly, the client device 110 may communicate with the prediction server 120 via one or more networks 115. The networks 115 may facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth, and others) or any combination thereof.

The prediction server 120 may store a set of processor-executable instructions that enable a user of the client device 110 and/or the prediction server 120 to predictively determine a risk of damage associated with a property. In some embodiments, the prediction server 120 is not a single server, but a distributed and/or cloud computing platform that includes any number of servers. For ease explanation, the present disclosure occasionally refers the prediction server 120 as a single server; however, as generally used herein, the term "server" in its singular form encompasses a network of different servers interacting with one another as part of a distributing computing environment.

As illustrated, the prediction sever 120 is operatively coupled to an image database 132 configured to store image data of a region, a model database 134 configured to store virtual models (including BIM models) of properties located in the region, a weather database 136 configured to store historical weather data for the region and probability distributions derived from the historical weather data, and a property database 138 configured to store information relating the properties located in the region. Although FIG. 1 depicts the databases 132-138 as coupled to the prediction server 120, it is envisioned that any of the database 132-138 may be maintained in the "cloud" such that any element of the environment 100 capable of communicating over the network 115 may directly interact with the databases 132-138. In some embodiments, any of the database 132-138 may be stored in a memory component of the prediction server 120 and/or the client device 110.

Generally, the functionality associated predictive modeling techniques described herein are divided between the client device 110 and the prediction server 120. In some embodiments, because the prediction server 120 generally has more powerful processing capabilities, the client device 110 may store and execute a light-weight application that enables the user of the client device 110 to control how the prediction server 120 executes a simulation. That is, in these embodiments, the client device 110 is configured to communicate control parameters to the prediction server 120 via the network 115 and the prediction server 120 interprets the control parameters to execute the simulations. The prediction server 120 may then transmit data and/or visual outputs to the client device 110 via the network 115 to enable the user of the client device 110 to view the result of the simulation.

In other embodiments, the client device 110 is configured to perform the simulation. In these embodiments, the client device 110 may periodically synchronize local versions of the databases 132-138 with a version of the databases 132-138 maintain by the prediction server 120. For example, over time, the prediction server 120 may obtain new historical weather data and update the probability distributions associated with one or more weather events. Accordingly, the client device 110 may be configured to poll the prediction server 120 upon launching the client application to determine whether the weather database 136 has been updated by the prediction server 120. As another example, the prediction server 120 may dispatch one or more imaging vehicles to capture image data of the region to update the models of the properties within the region. Accordingly, the client device 110 may be configured to poll the prediction server 120 to determine whether the model database 134 has been updated by the prediction server 120.

Figure 2:
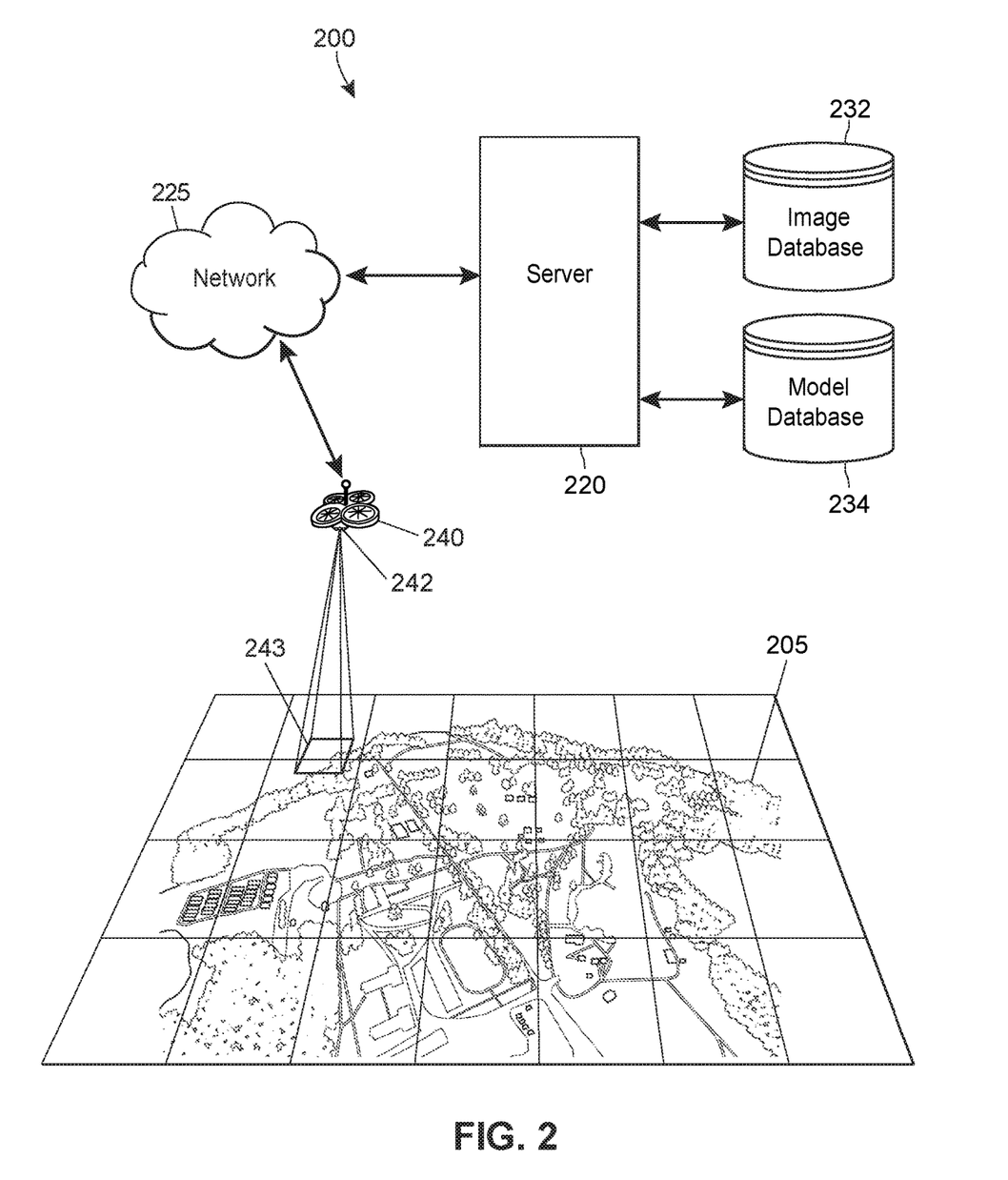
FIG. 2 depicts an example environment wherein an imaging vehicle captures a set of image data representative of a region.

Turning to FIG. 2, illustrated is an example environment 200 wherein an imaging vehicle 240 captures a set of image data representative of a region 205. As illustrated, the environment 200 includes an imaging vehicle 240 one or more image sensors 242 configured to capture image data while traversing the region 205. The region 205 may include a plurality of properties, such as structures (e.g., a house, building, silo, billboard, or other structures), vegetation (e.g., farm land, forests, prairie, grassland, and so on), throughways (roads, paths, trails), and/or any other type of property. Although FIG. 2 only depicts a single imaging vehicle 240, in other embodiments multiple imaging vehicles 240 may be used to capture the set of image data.

As described herein, the image sensors 242 are configured to capture high-resolution image data representative of the region 205. Accordingly, the image sensors 242 may be configured to capture image data at a sufficient resolution to represent the region 205 at an accuracy with 10 cm. To achieve this resolution, the imaging vehicle 240 may be configured to traverse the region below a particular altitude thereby capturing the image data from a position closer to the particular properties within the region 205. According to aspects, color information is useful in determining the particular material and/or type of vegetation in the environment. Accordingly, the image sensors 242 may be configured to capture color image data representative of the region 205.

According to certain aspects, the imaging vehicle 240 may be manually or autonomously piloted. The imaging sensors 242 may include be associated with a field of imaging 243 indicative of the particular portion of the region represented by the captured set of image data. As the imaging vehicle 240 traverses the region 205, the field of imaging 243 also moves. Accordingly, the imaging vehicle 240 may capture imaging data indicative of the different portions of the overall region 205. It should be appreciated that in some embodiments, the field of imaging 243 is not at a fixed angle below the imaging vehicle 240, but may pan, tilt, and/or zoom to capture image data indicative of the region 205 at different angles. In some implementations, the imaging vehicle 240 captures image data such that there is an overlap between successive sets of captured image data. These overlaps provide additional image data about the same location of the region 205, which enables more accurate determination of the dimensions of features (e.g., structures, trees, roads, water, and so on) of the region 205.

The imaging vehicle 240 may also include a communication apparatus for transmitting, via a communication network 225, the captured sets of image data to a server 220 (such as the prediction server 120 of FIG. 1). The communication network 225 may support communications via any standard or technology (e.g., GSM, CDMA, TDMA, WCDMA, LTE, EDGE, OFDM, GPRS, EV-DO, UWB, IEEE 802 including Ethernet, WiMAX, and/or others). The server 220 may store any received image data at an image database 234 (such as the image database 134 of FIG. 1).

According to aspects, the server 220 may analyze the image data stored at the image database 234 to generate virtual models of the region 205 and/or the various properties therein. To generate a virtual model, the server 220 may analyze the image data to determine dimensions for the various properties of the region 205 and/or to adapt the image data to appear on the appropriate dimension of each property. In some implementations, the server 220 generates a virtual model for a plurality of the properties of the region 205. Accordingly, the virtual model for the region 205 may include several virtual models of the various properties within the region 205. The server 220 may then store the generated virtual models at a model database 234 (such as the model database 134 of FIG. 1). In other embodiments, to obtain the virtual model of a structure, the server 220 analyzes the image data stored at the image database 232 to determine an address associated with the structure. Based on the determined address, the server 220 queries a BIM database (not depicted) to obtain a BIM model of the structure.

Figure 3:
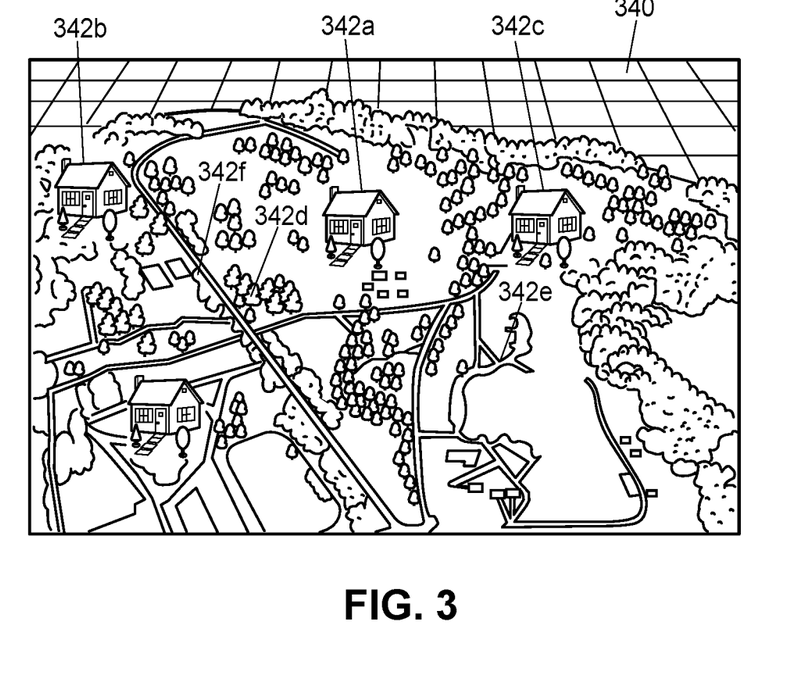
FIG. 3 depicts an example virtual model of the region.

FIG. 3 illustrates an example virtual model 340 of a region (such as the region 205 of FIG. 2). For example the virtual model 340 may be generated by the prediction servers 120 or 220 in response to obtaining image data of the region. As illustrated, the virtual model 340 includes component models of various properties included within the modeled region. For example, the virtual model 340 includes a model of the homes 342a, 342b, and 342c, a model of the trees 342d, a model of the retention pond 342e, and a model of the road 342f.

As described herein, the models 342 do not merely reflect the visual appearance of the corresponding property, but also the behavior of the various materials to comprise the corresponding properties. For example, based on an analysis of the image data stored in an image database (such as the image database 132 of FIG. 1), the prediction server may identify the tree modeled by the model 342d as an oak tree and associate the model 342d with a set of properties (e.g., a trunk strength, a root growth radius, a water absorptiveness, etc.) corresponding to oak trees. Similarly, the prediction server may identify a water holding capacity of the retention pond modeled by the model 342e to identify an amount of rain water and/or runoff that can be contained within the retention pond before overflowing.

Of course, the specific properties identified in FIG. 3 are merely example properties that are identified and modeled by the prediction server. In implementations, the prediction server may model as many properties as possible to provide the most accurate representation of the region to more accurately predict the ability of the properties to withstand weather events. Accordingly, various embodiments include modeling unlabeled aspects of the virtual model 340, such as the various grasses, roadways, farm lands, and so on also included in virtual model 340. In addition to the material that forms the property, the topography of the property is also modeled. That is, for properties that include yards, farmland, grassland, or other outdoor spaces, the specific topography is modeled. As a result, the simulation software can model and predict the flow of water throughout the region's topography during a weather event.

Figure 4:
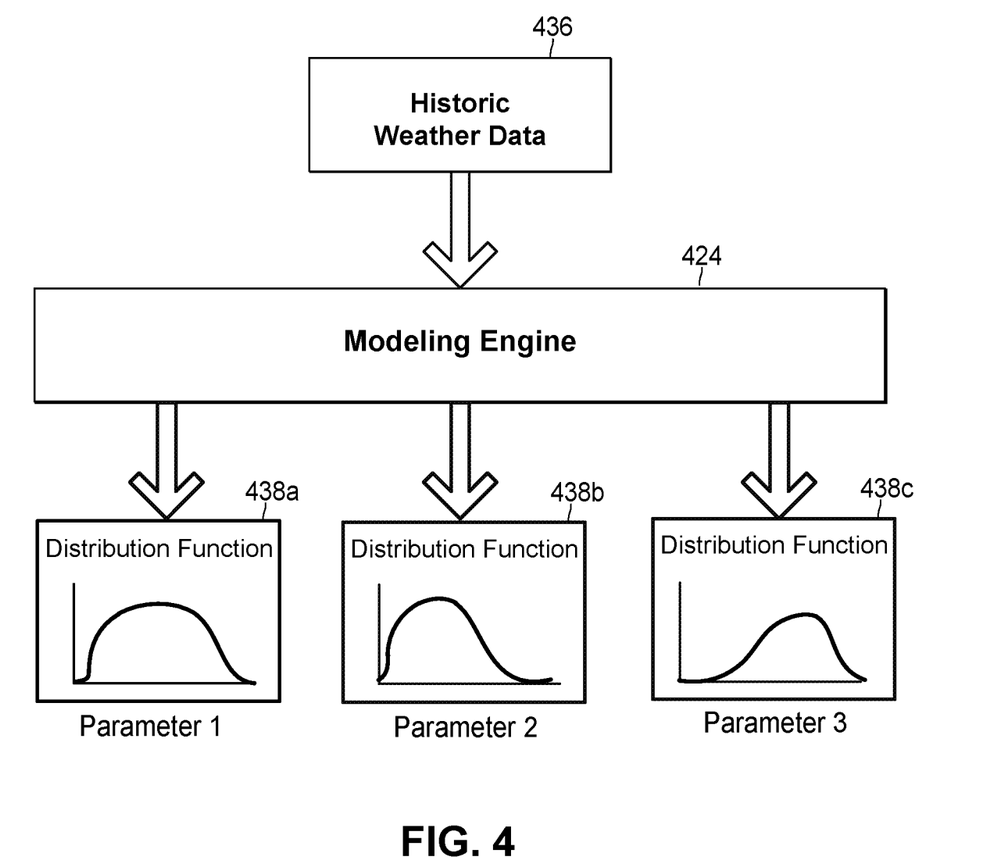
FIG. 4 depicts a block diagram for generating a predictive model for one or more parameters of a simulation environment.

Turning now to FIG. 4, illustrated is a block diagram of an example prediction server (such as the prediction server 120 of FIG. 1) generating a predictive model for one or more parameters of a simulation environment. More particularly, FIG. 4 illustrates a modeling engine 424 of the prediction server generating a predictive model for a set of inputs that that relate to how weather acts upon a virtual model of a region in a simulation environment.

As illustrated, the prediction server begins by analyzing historic weather data 436 stored in a weather database (such as the weather database 136 of FIG. 1). For example, the weather data 436 may indicate flood and/or storm recurrence probabilities (such as those maintained by the United States Geological Survey (USGS)), water level data, water discharge rates, historical stream flow data, and/or precipitation frequency estimates (such as those maintained by the National Oceanic and Atmospheric Administration (NOAA)) for various precipitation intensities. The weather data 436 may also be associated with a geographic location. Accordingly, when predicting the risk associated with a specific property, the prediction server may obtain weather data that is associated with a geographic location proximate to the geographic location to the property.

Additionally, the prediction server utilizes a modeling engine 424 to convert the historic weather data 436 into one or more predictive models. More particularly, the prediction server may determine one or more input parameters associated with weather events in the simulation environment of a simulation application and generate one or more probability distributions for the input parameters. For example, a first parameter may correspond to the probability of a body of water experiencing a 5 year flood, a second parameter may correspond to an intensity of rainfall, and a third parameter may correspond to an amount of rainfall. Of course, any number of parameters associated with the simulation environment can be modeled by the modeling engine 424.

After identifying the particular parameters to model, the prediction server may then generate a probability distribution 438 for each of the parameters. For some parameters, the probability distribution may be obtained via the historic weather data 436. For example, if the historic weather data 436 includes a storm recurrence probability for storms of a particular intensity, the modeling engine 424 may utilize this probability to define the probability distribution 438 for a parameter associated with a presence of a storm of the particular intensity. For other parameters, the modeling engine 424 analyzes the historic weather data 436 to develop the probability distribution 438. In one example, the modeling engine 424 applies a regression model (such as a linear, quadratic or a Bayesian regression model) to the historic weather data 436 to derive the probability distribution 438. The prediction server may store the generated probability distributions 438 in the a weather database (such as the weather database 136 of FIG. 1) and/or a probability database (not depicted).

Figure 5:
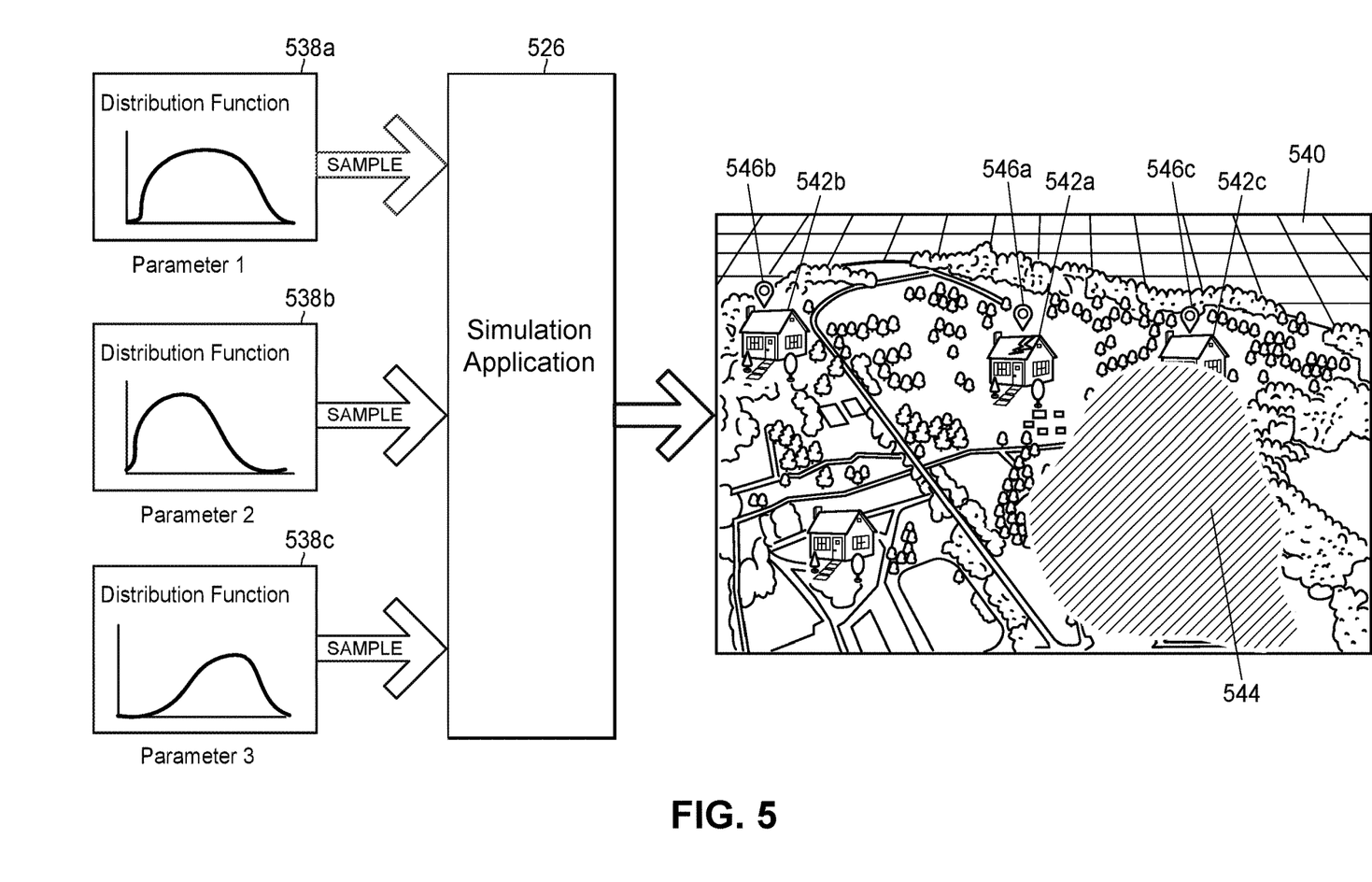
FIG. 5 depicts a block diagram for predictively simulating the impact of weather on the region and a corresponding simulation result.

FIG. 5 depicts a block diagram of predictively simulating the impact of weather on the region and a corresponding simulation result. More particularly, FIG. 5 depicts a simulation application 526 sampling one or more probability distributions 538 (such as the probability distributions 438 of FIG. 4) to execute a simulation of how weather impacts a region (such as the region 205 of FIG. 2). In some embodiments, the simulation application 526 is stored and executed by a client device (such as the client device 110 of FIG. 1). In other embodiments, the simulation application 526 is stored and executed by a prediction server (such as the prediction server 120 of FIG. 1). In yet other embodiments, a client device and a prediction server operate in conjunction with one another to execute the simulation application 526.

The simulation application 526 may be configured to accurately model how water and/or wind acts upon the component properties of the region. The simulation application 526 may include a physics engine that is configured to replicate how objects act in the real world. In some embodiments, the physics engine may include a computation fluid dynamics model that models how water flows across various surfaces and/or topographies. That is, the simulation application 526 may be configured to generate water objects in the simulation environment and determine how the water flows through the region's topography as replicated by high-resolution models of the region.

As another example, the simulation application 526 may include a model for the component materials the of properties within the region, such as structures, ground surfaces, vegetation, and/or sewage elements. For example, the simulation application 526 may model wood, steel, aluminum, vinyl, and/or other materials commonly associated with structures to determine the structure's resistivity to wind and/or water. As another example, the simulation application 526 may model how fast water flows across ground surface materials (e.g., asphalt, grass (and/or various species thereof), dirt, etc.) and/or how much water can be absorbed by the ground surface material. As still another example, the simulation application 526 may model a water drainage rate of a sewage element to accurately simulate when a weather system produces more water than the sewage element can receive without flooding.

Prior to executing the simulation, the client device and/or the prediction server imports a virtual model of a region 540 (such as the virtual model 340 of FIG. 3) into a simulation environment. The client device and/or the prediction server may obtain the virtual model of the region 540 from a model database (such as the model database 134 of FIG. 1). In some embodiments, the simulation application 526 is configured to receive an indication of the region (e.g., a geographic coordinate, an indication of a city/state, a zip code, etc.) from a user. The client device and/or the prediction server then queries the model database to obtain the virtual model corresponding to the indication.

As illustrated, the client device and/or the prediction server obtains the probability distributions 538 corresponding to one or more input parameters of the simulation application 526. In some embodiments, the prediction server and/or the client device may obtain the probability distributions 538 directly from a weather database (such as the weather database 136 of FIG. 1) and/or a probability database. In other embodiments where the simulation application is executed by a client device, the client device may instruct the prediction server to obtain the probability distributions 538 and transmit them to back to the client device. After obtaining the probability distributions 538, the client device and/or the prediction server randomly samples the probability distributions 538 to determine the particular inputs for the simulation.

The simulation application 526 then generates, in accordance with the sampled input parameters, a weather event and simulates the impact of the weather event as it acts upon the imported virtual model of the region 540. According to aspects, the simulation application 526 models how the weather event moves across the simulation environment. As a result, the weather event impacts portions of the simulation environment differently. As one example, based on the physics engine and/or historical data, the weather event may weaken or strengthen as it moves across the simulation environment, for example, based on the presence of hills, valleys, and/or distance from a body of water.

In the illustrated embodiment, the simulation application 526 enables the user to view the impact of the weather event on the virtual model of the region 540. In this embodiment, the simulation application 526 may generate and present indicators 546 that indicate an impact of the weather event on corresponding models 542. Accordingly, if the user interacts with an indicator 546, the indicator 546 may include additional details about the damage to the model 542, such as an extent of damage, a cost associated with the damage, a cause of the damage, an identity of a damage component, and any other information describing the damage to the model 542.

In the illustrated scenario, the simulated weather event caused a flood 544 (for example, by overloading a retention pond as modeled by the model 342e of FIG. 3). As illustrated, the home modeled by a component virtual model 542c is partially underwater. Accordingly, the model 542c is associated with an indicator 546c that indicates the damage to the model 542c. Similarly, as illustrated, the home modeled by a component virtual model 542a experienced damage to the roof. Accordingly, the model 542a is associated with an indicator 546a that indicates the damage to the model 542a. Additionally, as illustrated, the home modeled by a component virtual model 542b experienced non-visible erosive damage as determined based on the model of the materials associated with the model 542b. Accordingly, the model 542b is associated with an indicator 546b that indicates the damage to the model 542b.

It should be appreciated that the simulation application 526 may execute the simulation and automatically analyze the result without presenting a visual representation of the virtual model 540 and the corresponding indicators 546 to a user of the client device and/or the prediction server. Accordingly, the simulation application 526 may be configured export the data associated with the indicators 546 to a simulation result file that tabulates the impact of the weather event on the various properties. For example, the result file may be a comma-separated value (CSV) or extensible markup language (XML) file that indicates an identifier and one or more values associated with the damage (and/or lack thereof) for each property in the region.

Figure 6:
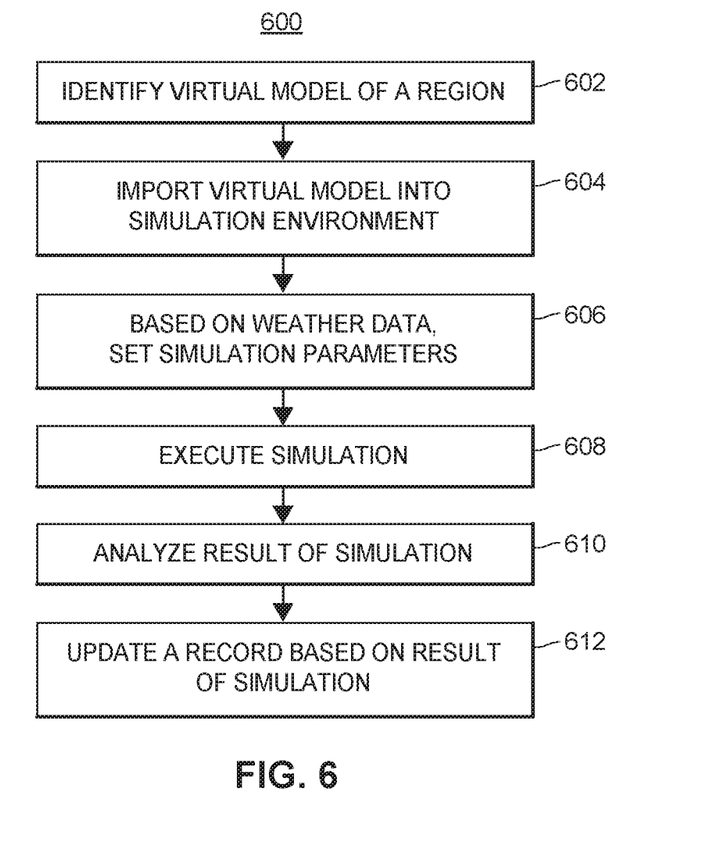
FIG. 6 depicts flow chart of an example method for predictively modeling risks associated with properties within a region.

Referring now to FIG. 6, illustrated is an example flow chart of an example method 600 for predictively modeling risks associated with properties within a region (such as the region 205 of FIG. 2). As described herein, the method 600 may be performed by a client device (such as the client device 110 of FIG. 1), a prediction server (such as the prediction server 120 of FIG. 1), and/or a combination thereof executing a simulation application (such as the simulation application 526 of FIG. 5). For ease of explanation, the following describes an embodiment where the method 600 is performed by a prediction server. That said, in alternative embodiments, some or all of the following functionality may be performed by the client device.

The method 600 begins when the prediction server identifies a virtual model of the region (block 602). As described with respect to FIGS. 2 and 3, the virtual model of the region may be a high-resolution digital twin of the region that models properties and/or the corresponding topographies within the region to an accuracy of at least 10 cm. In some embodiments, the prediction server is configured to receive an indication of a particular property to analyze for potential risks of damage. For example, the prediction server may receive the indication of the particular property in response to a property owner applying for an insurance product to cover the property. Accordingly, the prediction server may identify geographic information associated with the indicated property (e.g., an address or a geographic coordinate). In other embodiments, the simulation application includes a map interface that enables a user to select a particular geographic location to analyze for potential risks of damage.

In response, the prediction server utilizes the geographic information to query a model database (such as the model database 134 of FIG. 1) to obtain the virtual model of the region. In some embodiments, the region is defined by a geographic radius centered about the geographic information. The radius may be a circular radius, a square radius, or any polygonal radius. In other embodiments, the region is defined by a user-selected region via the map interface. In yet other embodiments, the model database may store pre-segmented virtual models corresponding to a plurality of regions. For example, the model database may store a virtual model for a particular flood plain. In these embodiments, the prediction server may identify the virtual model in which the geographic information is located.

At block 604, the prediction server imports the identified virtual model of the region into a simulation environment. The simulation environment may include a physics engine that includes computational fluid dynamics that accurately approximates how real world forces (e.g., gravity, friction, erosion) act upon a corresponding object (e.g., a structure or water) in the real world. Upon importing the virtual model of the region, the simulation application generates an accurate virtual representation of the region, including the topography of the region and/or the various materials that comprise the properties within the region. In some embodiments, the simulation application is configured to present a rendered visualization of the virtual model of the region. In other embodiments, the simulation environment is not presented to a user of the prediction server.

At block 606, the prediction server sets one or more simulation parameters (e.g., a precipitation amount, a precipitation intensity, a wind direction, a wind intensity, an indication of whether a type of weather event to simulate (such as a tornado, a tropical storm, a hurricane, a cyclone, a typhoon, and/or a particular intensity and/or category thereof), and/or any other input weather parameter supported by the simulation application) based on historic weather data. For example, as described with respect to FIG. 4, the prediction server utilize the modeling engine 424 to generate a plurality of probability distributions 438 based on the historic weather data 436. Accordingly, the prediction server may sample one or more of the plurality of probability distributions to determine the value at which the simulation parameter is set.

At block 608, the prediction server executes a simulation in accordance with the simulation parameters. That is, the prediction server causes the simulation application to generate a simulated weather event that acts upon the virtual model of the region. As described herein, the simulation application includes a physics engine that accurate models how wind and/or precipitation acts upon specific portions of the region based on the specific materials and/or topographies of the properties within the region. As a result, the simulation application models how the weather event impacts a specific property as opposed to other similarly situated properties within the region.

In some embodiments, the prediction server executes a plurality of simulations. For example, the prediction server may be configured to execute 100, 500, 1000, 5000, 10000, or even more simulations. Accordingly, prior to each simulation, the prediction server may sample a new set of simulation parameters based on the respective probability distributions. For example, the prediction server may implement Monte Carlo sampling techniques and/or particle filtering techniques to sample the probability distributions across the plurality of simulations. By executing a plurality of simulations using Monte Carlo and/or particle filtering sampling techniques, the prediction server simulates the most likely weather conditions a property of interest will experience. In some embodiments, the state of the component virtual models are restored to their original condition after each simulation (or after a fixed number of simulations). In other embodiments, the output state of a most recent simulation is utilized as the input state for a next simulation. In these embodiments, the prediction server can predict the likely condition of a particular property at a particular point in the future (e.g., 3 years, 5 years, 10 years, and/or a particular timeframe associated with an insurance product) by setting the number of consecutive simulations to correspond to a number of days (and/or a number of days historically associated with weather events within a specific time period based on the historic weather data).

At block 610, the prediction server analyzes the result of the simulation to determine a risk of damage to properties within the virtual model of the region. More particularly, the prediction server analyzes the simulation result to determine whether component virtual model of a property included in the virtual model of the region was damaged during the simulation and/or an extent of damage thereto. For example, the simulation application may cause a particular property to flood due to being located proximate to a pooling point of water. As another example, the simulation application may cause another property to be damaged by a branch that broke off of a tree near the property. As still another example, the simulation application cause another property to experience roof damage due to hail. As yet another example, the simulation application may cause another property to experience erosion due to the various weather conditions. Of course, these are only example types of damage that may be experienced by the component virtual models during a simulation. The prediction server may be configured to analyze the simulation result for any type of damage supported by the simulation application. Accordingly, the prediction server is capable of accurately determining the different types of damage that are likely to occur to each specific property.

In some embodiments, the prediction server is configured to parse the result file to determine the damage level and/or type of damage experienced by the component virtual models. If the prediction server executed a plurality of simulations, the prediction server may be configured the simulation results for plurality of simulations to determine the risk of damage. In Based on the type and/or extent of damage the component virtual model experiences during the simulation (s), the prediction server may generate a score indicative of a predicted risk of damage of to the corresponding property. In some embodiments, the score is also based on a minimum level of weather severity required to cause damage to the property and a determined likelihood of the corresponding weather severity actually acting upon the property.

Additionally or alternatively, the prediction server may present a visual interface of the simulation application that enables a user of the prediction server to view the simulation result (such as the simulation result 540 of FIG. 5). In these embodiments, the simulation application may be configured to populate a plurality of overlays in the visual interface detailing the level damage to the component virtual models and/or the generated scores. In some embodiments, the simulation application is configured to present an overlay that indicates particular regions that are likely to experience damage (such as flooding) and/or indicates properties that have scores within certain thresholds (based on absolute and/or relative scores).

At block 612, the prediction server is configured to update records in a property database to indicate the determined predicted risk of damage. As described herein, the prediction server may be operatively connected to a property database (such as the property database 138 of FIG. 1) that maintains records for a plurality of properties. The prediction server may be configured to associate a plurality of properties modeled by the virtual model of the region to a corresponding record associated with the property in the property database. Accordingly, the prediction server may update the record corresponding to properties modeled by the virtual model of the region to include the determined risk of damage and/or generated score. By updating the property database, the predicted risk of damage can be synchronized with other computer systems that utilize the risk of damage in performing their functionality. For example, one such computer system may relate to approving an insurance application for underwriting and/or providing discounts on insurance products associated with properties that have taken preventative measures to reduce a risk of damage. Another example computer system may identify preventative measures that can be undertaken to reduce a community's risks associated with weather events that are likely to occur. It should be appreciated that the method 600 may include additional, fewer, or alternate actions, including those discussed elsewhere herein.

Figure 7:
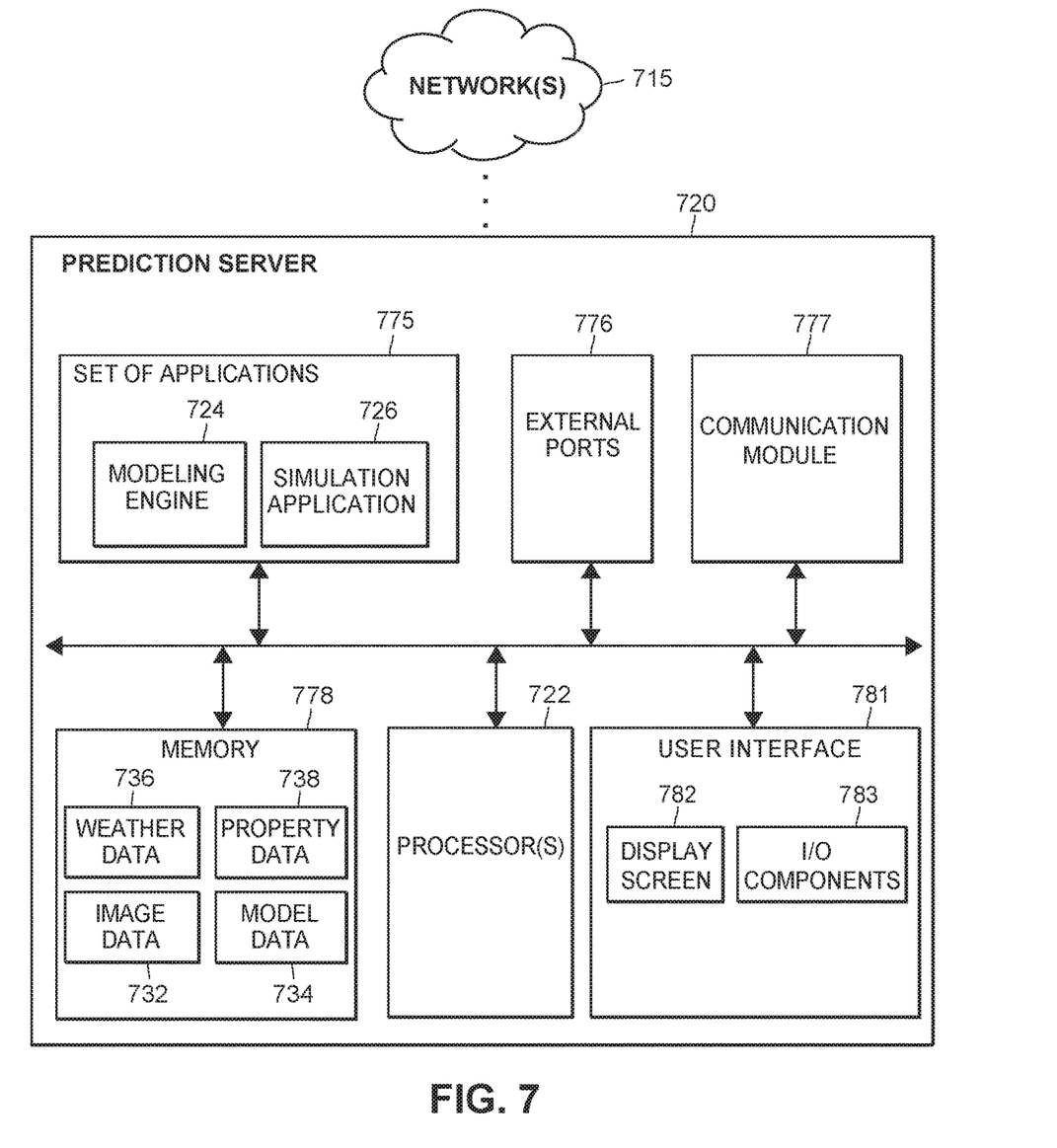
FIG. 7 depicts a block diagram of an example prediction server.

FIG. 7 illustrates a diagram of an example prediction server 720 (such as the prediction server 120 of FIG. 1) in which the functionalities as discussed herein may be implemented. The prediction server 720 may include one or more processors 722 as well as a memory 778. The memory 778 may store an operating system 779 capable of facilitating the functionalities as described herein. The memory 778 may further image data 732, model data 734, historic weather data 736 and/or property data 738, as described elsewhere herein. The prediction server 720 may also store a set of applications 775 (i.e., machine readable instructions). For example, one of the set of applications 775 may be a modeling engine 724 configured to convert the historic weather data 736 into one or more probability distributions. As another example, another of the set of applications 775 may be a simulation application 726 configured to simulate one or more weather events in a simulation environment based upon a determined set of simulation inputs. It should be appreciated that other applications are envisioned.

The one or more processors 722 may interface with the memory 778 to execute the operating system 779 and the set of applications 775. The memory 778 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The prediction server 720 may further include a communication module 777 configured to communicate data via one or more networks 715. According to some embodiments, the communication module 777 can include one or more transceivers (e.g., WWAN, WLAN, and/or WPAN transceivers) functioning in accordance with IEEE standards, 3GPP standards, or other standards, and configured to receive and transmit data via one or more external ports 776. For example, the communication module 777 may receive, via the network 715, image data representative of a region to store with the image data 732 and/or to generate corresponding virtual models that are stored with the model data 734. The prediction server 720 may further include a user interface 781 configured to present information to the individual and/or receive inputs from a user. As shown in FIG. 7, the user interface 781 may include a display screen 782 and/or I/O components 783 (e.g., ports, capacitive or resistive touch sensitive input panels, keys, buttons, lights, LEDs, speakers, microphones). According to the present embodiments, the user may access the prediction server 720 via the user interface 781 to update the operating system 779, execute one or more simulations using the simulation application 726, and/or perform other functions. In some embodiments, the prediction server 720 may perform the functionalities as discussed herein as part of a "cloud" network or can otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the one or more processors 722 (e.g., working in connection with the operating system 779) to facilitate the functions as described herein. In this regard, the program code may be implemented in any desired language, and may be implemented as machine code, assembly code, byte code, interpretable source code or the like (e.g., via Python, or other languages, such as C, C++, Java, Actionscript, Objective-C, Javascript, CSS, XML). In some embodiments, the computer program product may be part of a cloud network of resources.

ADDITIONAL CONSIDERATIONS

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, and improve the functioning of conventional computers.

The invention claimed is:

1. A computer-implemented method comprising:
identifying, by one or more processors, a virtual model of a region, the virtual model being generated based upon a plurality of color images captured by one or more image sensors on one or more remote imaging vehicles, wherein the virtual model models the region to at least a minimum resolution and includes component virtual models of a plurality of properties in the region;
identifying, by the one or more processors and based on color information from the plurality of color images, a plurality of features of the virtual model, wherein the plurality of features includes a vegetation type;
importing, by the one or more processors, the virtual model of the region into a simulation environment;
obtaining, by the one or more processors, one or more probability distributions based on historical weather data associated with the region;
determining, by the one or more processors and based on the one or more probability distributions, a parameter value indicative of a weather system associated with the region;
executing, by the one or more processors, a simulation in the simulation environment, wherein as part of the simulation, the weather system characterized by the parameter value acts upon the virtual model of the region;
analyzing, by the one or more processors and using a predictive model, a result of the simulation to determine a risk of damage to a component virtual model of a property in the region during the simulation, wherein analyzing the result includes entering at least one of the historical weather data and the vegetation type as an input to the predictive model, wherein the component virtual model includes a visual indication of damage; and
updating, by the one or more processors, a record corresponding to the property to indicate the risk of damage to the component virtual model of the property during the simulation.

2. The computer-implemented method of claim 1, further comprising:
setting, by the one or more processors, a parameter of one or more parameters indicative of at least one of a precipitation amount, a precipitation intensity, a wind direction, a wind intensity, or an indication of whether a weather event is occurring, wherein the weather event is at least one of a tornado, a tropical storm, a cyclone, a typhoon, or a hurricane.

3. The computer-implemented method of claim 1, wherein executing the simulation comprises:
executing, by the one or more processors, a plurality of simulations.

4. The computer-implemented method of claim 3, further comprising:
prior to executing a particular simulation of the plurality of simulations, sampling, by the one or more processors, the one or more probability distributions to determine a particular parameter value for the particular simulation.

5. The computer-implemented method of claim 4, wherein sampling the one or more probability distributions comprises:
executing, by the one or more processors, Monte Carlo sampling techniques to determine the particular parameter value.

6. The computer-implemented method of claim 4, wherein obtaining the one or more probability distributions comprises:
receiving, via a communication network and from a prediction server, the one or more probability distributions.

7. The computer-implemented method of claim 3, further comprising:
analyzing, by the one or more processors, the results of the plurality of simulations to determine a probability the virtual model of the property experiences one or more levels of damage.

8. The computer-implemented method of claim 7, wherein updating the record corresponding to the property to indicate the level of damage to the virtual model of the property during the simulation comprises:
updating, by the one or more processors, the record corresponding to the property to indicate the probability the virtual model of the property experiences one or more levels of damage.

9. The computer-implemented method of claim 8, further comprising:
based on the probabilities the virtual model of the property experiences one or more levels of damage, performing at least one of offering a discount on an insurance products associated with the property or approving an insurance product associated with the property for underwriting.

10. The computer-implemented method of claim 1, wherein executing the simulation comprises:
identifying, by the one or more processors, the component virtual models of the plurality of properties in the region, wherein the plurality of properties include a ground surface or material, vegetation, a structure, a sewage element, or a topographical element; and
associating, by the one or more processors, each property with a material and/or a model of how the property reacts when exposed to at least one of wind or water.

11. The computer-implemented method of claim 10, wherein:
a particular property is the structure; and
the component virtual model of the property is determined based upon a building information modeling (BIM) model of the structure.

12. The computer-implemented method of claim 10, wherein executing the simulation comprises:
executing, by the one or more processors, a computational fluid dynamics model to determine how water associated with the weather system flows through the virtual model of the region, wherein the computational fluid dynamics model analyzes the material and/or model of the plurality of features of the virtual model when determining how the water flows through the virtual model of the region.

13. A system comprising:
one or more processors;
one or more transceivers operatively connected to the one or more processors and configured to send and receive communications over one or more communication networks; and
one or more non-transitory memories coupled to the one or more processors and storing computer-executable instructions, that, when executed by the one or more processors, cause the system to:

identify a virtual model of a region, the virtual model being generated based upon a plurality of color images captured by one or more image sensors on one or more remote imaging vehicles, wherein the virtual model models the region to at least a minimum resolution and includes component virtual models of a plurality of properties in the region;

identify, based on color information from the plurality of color images, a plurality of features of the virtual model, wherein the plurality of features includes a vegetation type;

import the virtual model of the region into a simulation environment;

obtain one or more probability distributions based on historical weather data associated with the region;

determine, based on the one or more probability distributions, a parameter value indicative of a weather system associated with the region;

execute a simulation in the simulation environment, wherein as part of the simulation, the weather system characterized by the parameter value acts upon the virtual model of the region;

analyze, using a predictive model, a result of the simulation to determine a risk of damage to a component virtual model of a property in the region during the simulation, wherein analyzing the result includes entering at least one of the historical weather data and the vegetation type as an input to the predictive model, wherein the component virtual model includes a visual indication of damage; and update a record corresponding to the property to indicate the risk of damage to the component virtual model of the property during the simulation.

14. The system of claim 13, wherein the one or more non-transitory memories comprise:
a first set of one or more memories storing computer-executable instructions at a client device; and
a second set of one or more memories storing computer-executable instructions at a prediction server.

15. The system of claim 13, wherein to execute the simulation, the instructions, when executed, cause the system to:
present a visual representation of the virtual model for the simulation; and
populate a plurality of overlays in the visual representation indicating damage levels to the component virtual models.

16. The system of claim 13, wherein to set the one or more parameters, the instructions, when executed, cause the system to:
execute a plurality of simulations;
and
prior to executing a particular simulation of the plurality of simulations, sample respective probability distributions to determine a particular parameter value for the particular simulation.

17. The system of claim 16, wherein to sample the respective probability distributions, the instructions, when executed, cause the system to:
execute Monte Carlo sampling techniques to determine the particular parameter value.

18. The system of claim 13, wherein to execute the simulation, the instructions, when executed, cause the system to:
identify the component virtual models of the plurality of properties in the region, wherein the plurality of properties includes a ground surface or material, vegetation, a structure, a sewage element, or a topographical element; and
associate each property with a material and/or a model of how the property reacts when exposed to at least one of wind or water.

19. A non-transitory computer-readable medium storing computer-executable instructions, that, when executed by one or more processors, cause one or more processors to:
identify a virtual model of a region, the virtual model being generated based upon a plurality of color images captured by one or more image sensors on one or more remote imaging vehicles, wherein the virtual model models the region to at least a minimum resolution and includes component virtual models of a plurality of properties in the region;

identify, based on color information from the plurality of color images, a plurality of features of the virtual model, wherein the plurality of features includes a vegetation type;

import the virtual model of the region into a simulation environment;

obtain one or more probability distributions based on historical weather data associated with the region;

determine, based on the one or more probability distributions, a parameter value indicative of a weather system associated with the region;

execute a simulation in the simulation environment, wherein as part of the simulation, the weather system characterized by the parameter value acts upon the virtual model of the region;

analyze, using a predictive model, a result of the simulation to determine a risk of damage to a component virtual model of a property in the region during the simulation, wherein analyzing the result includes entering at least one of the historical weather data and the vegetation type as an input to the predictive model, wherein the component virtual model includes a visual indication of damage; and update a record corresponding to the property to indicate the risk of damage to the component virtual model of the property during the simulation.

20. The system of claim 13, wherein:
the property includes a particular structure; and the component virtual model of the property is determined based upon a building information modeling (BIM) model of the particular structure indicating a material of an internal structural component.

* * * * *